(12) United States Patent
Szasz et al.

(10) Patent No.: US 11,287,347 B2
(45) Date of Patent: Mar. 29, 2022

(54) TEMPERATURE-COMPENSATED STRAIN GAUGE MEASUREMENTS

(71) Applicant: ABB Schweiz AG, Baden (CH)

(72) Inventors: Paul Szasz, Plankstadt (DE); Andreas Decker, Darmstadt (DE)

(73) Assignee: ABB Schweiz AG, Baden (CH)

( * ) Notice: Subject to any disclaimer, the term of this patent is extended or adjusted under 35 U.S.C. 154(b) by 58 days.

(21) Appl. No.: 16/941,570

(22) Filed: Jul. 29, 2020

(65) Prior Publication Data

US 2021/0033481 A1    Feb. 4, 2021

(30) Foreign Application Priority Data

Jul. 31, 2019    (EP) ..................................... 19189371

(51) Int. Cl.
| | |
|---|---|
| *G01L 9/06* | (2006.01) |
| *G01L 9/04* | (2006.01) |
| *G01L 27/00* | (2006.01) |
| *G01L 9/02* | (2006.01) |
| *G01L 19/00* | (2006.01) |

(52) U.S. Cl.
CPC ............ *G01L 27/002* (2013.01); *G01L 9/025* (2013.01); *G01L 9/04* (2013.01); *G01L 9/06* (2013.01); *G01L 9/065* (2013.01); *G01L 19/0092* (2013.01)

(58) Field of Classification Search
CPC ... G01L 3/24; G01L 3/242; G01L 5/08; G01L 5/10; G01L 5/101; G01L 5/108; G01L 5/16; G01L 5/1627; G01L 5/167; G01L 5/22; G01L 5/28; G01L 23/085; G01L 23/20; G01L 5/0061; G01L 5/0071; G01L 5/008; G01L 5/06; G01L 5/171; G01L 7/106
USPC .................................................... 73/700–756
See application file for complete search history.

(56) References Cited

U.S. PATENT DOCUMENTS

| | | |
|---|---|---|
| 2,420,148 A | 5/1947 | Ostergren |
| 3,470,738 A | 10/1969 | Laimins |
| 4,420,980 A | 12/1983 | Dunemann et al. |

(Continued)

FOREIGN PATENT DOCUMENTS

| | | | |
|---|---|---|---|
| CN | 108267262 A | * | 7/2018 |
| DE | 102015109450 A1 | | 12/2016 |

(Continued)

*Primary Examiner* — Andre J Allen
(74) *Attorney, Agent, or Firm* — Leydig, Voit & Mayer, Ltd.

(57) ABSTRACT

A device for measuring a strain of an object independently of temperature variations includes: at least one strain gauge that is attachable directly or indirectly to the object whose strain is to be measured; a first temperature sensor for measuring a temperature of the at least one strain gauge; read-out electronics for measuring a change of electrical resistance of the at least one strain gauge as a measured electrical resistance change, the read-out electronics including at least one fixed resistor whose value is relied upon when obtaining a value of the change of electrical resistance of the strain gauge as a result of the measurement, the read-out electronics being such that a temperature of the at least one fixed resistor is known and/or obtainable by measurement; and an evaluation unit for: correcting the measured electrical resistance change, and/or a strain of the strain gauge and/or the strain of the object.

15 Claims, 7 Drawing Sheets

(56) References Cited

U.S. PATENT DOCUMENTS

| | | | |
|---|---|---|---|
| 4,510,813 A * | 4/1985 | Kanazawa | G01L 1/2281 338/9 |
| 4,738,140 A | 4/1988 | Kempf | |
| 5,001,454 A * | 3/1991 | Yamadera | G01L 1/2287 338/2 |
| 5,460,049 A * | 10/1995 | Kirsch | G01L 9/065 73/152.52 |
| 5,460,050 A * | 10/1995 | Miyano | G01L 1/2281 73/708 |
| 6,957,588 B1 | 10/2005 | Kicher et al. | |
| 7,928,865 B2 * | 4/2011 | Hofmann | G11B 20/00579 341/58 |
| 10,732,063 B2 | 8/2020 | Szasz et al. | |
| 2007/0284112 A1 | 12/2007 | Magne et al. | |
| 2009/0056466 A1 * | 3/2009 | Moran | G01L 1/2281 73/766 |
| 2009/0126498 A1 | 5/2009 | Gilch et al. | |
| 2009/0255736 A1 | 10/2009 | Naito et al. | |
| 2014/0251020 A1 | 9/2014 | Offer et al. | |
| 2015/0055679 A1 | 2/2015 | Li | |
| 2017/0205220 A1 * | 7/2017 | Fahimi | G01D 3/036 |
| 2018/0283968 A1 | 10/2018 | Gasch et al. | |
| 2021/0131898 A1 * | 5/2021 | Botker | G01L 9/045 |

FOREIGN PATENT DOCUMENTS

| | | | | |
|---|---|---|---|---|
| DE | 102015121425 A1 | 6/2017 | | |
| EP | 0049501 A2 | 4/1982 | | |
| EP | 0210523 A1 | 2/1987 | | |
| EP | 0082698 B1 * | 5/1989 | | G01L 1/2281 |
| EP | 3599451 A1 | 1/2020 | | |
| FR | 2215615 A1 | 8/1974 | | |
| FR | 2497340 A1 * | 7/1982 | | G01L 1/2281 |
| FR | 2864202 A1 | 6/2005 | | |
| GB | 2087144 A * | 5/1982 | | G01B 7/20 |
| GB | 2201791 A | 9/1988 | | |
| KR | 20130002479 U | 4/2013 | | |
| WO | WO 9837395 A1 | 8/1998 | | |

\* cited by examiner

TEMPERATURE-COMPENSATED STRAIN GAUGE MEASUREMENTS

CROSS-REFERENCE TO PRIOR APPLICATION

Priority is claimed to European Patent Application No. EP 19 189 317.8, filed on Jul. 31, 2019, the entire disclosure of which is hereby incorporated by reference herein.

FIELD

The invention relates to improving the accuracy when measuring the deformation of objects with strain gauges, especially in applications where no full Wheatstone bridge circuits can be applied.

BACKGROUND

Strain gauges are elements that change their electrical resistance as a function of the strain applied to them. The typical way to measure this very small resistance change is the use of Wheatstone bridge circuits that enable much better resolution than any other competitive measurement method. The strain gauges are fixed to objects, such as bending or tensile beams, and/or torsion bars, to measure their deformation. In another application, the pressure inside a pipe or vessel may be indirectly measured via the elastic deformation this pressure causes.

U.S. Pat. No. 6,957,588 B1 discloses a pressure measuring device for fluids that comprises a sensing tube configured to deform outwards in response to the fluid pressure. The deformation is measured by multiple strain gauges that may form a Wheatstone bridge.

US 2014/251 020 A1 discloses a variant of such a device that is in the form of a clamp. The clamp may be rigidly attached to a pipe, so that the deformation of the pipe results in a deformation of the clamp that may then be measured.

The electrical resistance of strain gauges is sensitive not only to changes of the strain, but also to changes of the temperature. This is typically compensated by using the strain gauges in full Wheatstone bridge circuits. However, in some cases, full Wheatstone bridge circuits cannot be realized, and other means are required to eliminate a temperature related measurement error.

SUMMARY

In an embodiment, the present invention provides a device for measuring a strain of an object independently of temperature variations, comprising: at least one strain gauge that is attachable directly or indirectly to the object whose strain is to be measured; a first temperature sensor configured to measure a temperature of the at least one strain gauge; read-out electronics configured to measure a change of electrical resistance of the at least one strain gauge as a measured electrical resistance change, the read-out electronics comprising at least one fixed resistor whose value is relied upon when obtaining a value of the change of electrical resistance of the strain gauge as a result of the measurement, the read-out electronics being configured such that a temperature of the at least one fixed resistor is known and/or obtainable by measurement; and an evaluation unit configured to: correct the measured electrical resistance change, and/or a strain of the strain gauge and/or the strain of the object determined from the resistance change, for contributions that arise from the temperature of the at least one strain gauge and from the temperature of the at least one fixed resistor, based on the temperature of the strain gauge, the temperature of the at least one fixed resistor, and pre-stored calibration data.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 1: Exemplary embodiment of method 100 for measuring strain 1a;

DETAILED DESCRIPTION

Figure 1:
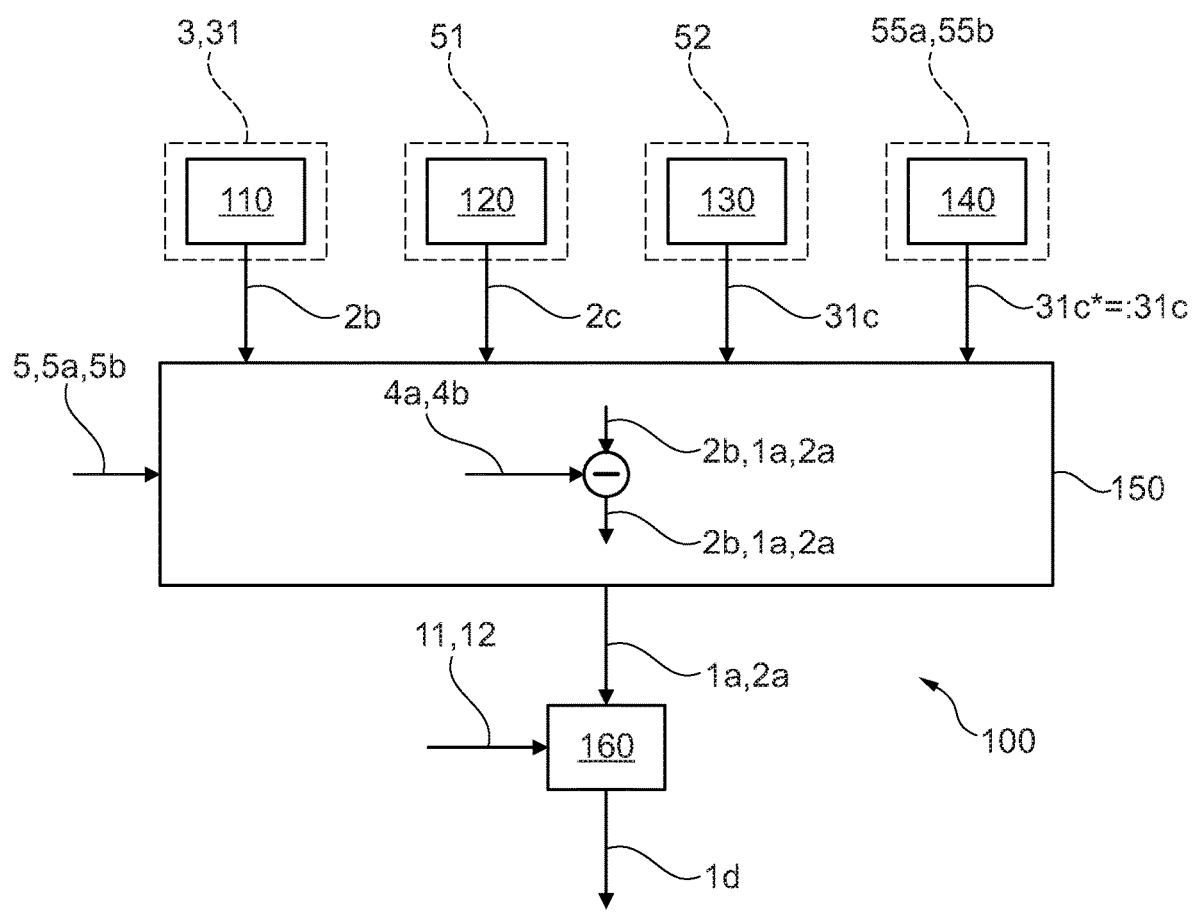

In an embodiment, the present invention reduces the impact of temperature changes on strain measurements performed using strain gauges, especially in all applications where no full Wheatstone bridge circuits can be applied.

In an embodiment, the present invention provides a method for measuring the strain of an object as described herein, a device for measuring the strain of an object as described herein, and a method for obtaining calibration data for use with the method or the device as described herein. Further advantageous embodiments are herein.

The invention may give some additional benefit even for full Wheatstone bridge circuits.

The invention provides a method for measuring the strain of an object using at least one strain gauge that changes its electrical resistance in response to a change in the strain. The strain gauge is mechanically coupled to the object, so that a change in the strain of the object translates into a change in the strain of the strain gauge.

In the course of the method, the electrical resistance change of the at least one strain gauge is measured using read-out electronics. The read-out electronics comprises at least one fixed resistor whose value is relied upon when obtaining the value of the electrical resistance change of the strain gauge as a result of the measurement. In particular, the read-out electronics may comprise a Wheatstone-bridge type circuit with the at least one fixed resistor.

For example, the read-out electronics may comprise a constant current source that drives a known current through the strain gauge, and measure the voltage drop across the strain gauge with a voltmeter. The known current that is output by the constant current source and used for the computation of the resistance change of the strain gauge is set using at least one fixed resistor. If the physical value of this fixed resistor changes, and this is not taken into account in the computation, this gives rise to an error in the finally obtained value of the resistance change.

If the strain gauge forms a bridge circuit with one or more fixed resistors and the imbalance of the Wheatstone bridge given as an output voltage is the primary measurement signal, then the computation of the resistance change of the strain gauge from this primary measurement signal also includes the resistance change of the one or more fixed resistors. If the physical values of the one or more fixed resistors change, and this is not taken into account in the computation, this gives rise to an error in the finally obtained resistance change.

Any errors in the finally obtained resistance change will propagate to the value of a strain determined from this resistance change.

To avoid such errors, the temperature of the strain gauge is measured. In addition, the temperature of the at least one fixed resistor is measured, and/or the temperature of the at least one fixed resistor is maintained at a known fixed value. The temperature error can be compensated if the temperatures of all involved fixed resistors are known somehow. For example, the temperature of one fixed resistor may be measured, and the temperature of the other fixed resistors may be derived from this measurement.

For example, the fixed resistor may be actively heated or cooled to a known temperature that will not change by a significant amount, akin to an oven controlled crystal oscillator, OCXO, in a frequency-determining element.

The measured electrical resistance change, and/or a strain of the strain gauge and/or a strain of the object determined from the measured electrical resistance change, is corrected for contributions that arise from the temperature of the strain gauge and from the temperature of the fixed resistor, based on the temperature of the strain gauge, the temperature of the fixed resistor, and pre-stored calibration data.

The calibration data may be obtained from any suitable source. For example, they may be provided by the manufacturer of the strain gauge or of the fixed resistor. But they may also be obtained later by on-site measurements.

The inventors have found that the signal contributions from temperature variations are significant in many technical applications. For example, objects that are mounted outdoors and that alternate between being exposed to the glare of the sun and to the chill of the night may experience daily temperature changes of up to around 100 K. Pipes and other vessels may experience temperature changes of the same order of magnitude when they alternate between conveying a hot fluid and being empty or conveying a colder fluid. In such applications, the signal contributions from temperature variations may exceed 100% of the full scale of an indirect pressure measurement performed by means of one or more strain gauges.

Specifically, in a particularly advantageous embodiment where the object is a pressurizable vessel and a pressure inside the vessel is to be determined from the measured strain, the geometry of the vessel and material properties of the vessel, the inventors have found that the effect of temperature changes cannot be fully compensated by merely using multiple strain gauges in a Wheatstone bridge configuration for several reasons:

For example, to measure the pressure in a pipe through which a pressurized fluid flows, strain gauges measuring the strain in, e.g., the axial and circumferential orientation would be needed. But the Wheatstone bridge configuration would then output a very low signal. As it is known to anyone skilled in the art, resistance changes of neighboring sensors in a Wheatstone bridge circuit are subtracted from one another, whereas resistance changes of opposing sensors are added to one another. A pressurized pipe shows a positive strain in both the circumferential and the axial direction, so said subtracting would cause the signal to become very small.

Also, in addition to the direct influence of the temperature on the resistance change of the strain gauges, there is another temperature-dependent contribution that is mediated through the thermal expansion of the pipe. While the thermal expansion of a steel pipe as such is isotropic, the thermal strains measured by strain gauges mounted in axial and circumferential directions are not identical. Even if the material of the pipe has the same strain everywhere, the strain gauge output varies with curvature radius, meaning that a circumferentially oriented strain gauge outputs a larger signal than an axially oriented strain gauge. This imbalance is particularly large for smaller pipe diameters of 100 mm and below, which are the most frequently used diameters in industrial processes. Consequently, a full Wheatstone bridge composed of axially and circumferentially oriented strain gauges will show a nonzero signal contribution due to thermal effects that would be very difficult to predict.

Finally, only the circumferential strains may be used for a pressure measurement because the axial strains contain more contributions that are dependent on other effects besides the pressure. Specifically, axial strains always result from a combination of the internal pressure and external constraints, such as pipe end fixings, thermal expansion constraints, and bending loads. Therefore, apart from the circumferential direction, there is no second direction for strain measurement that could be unambiguously correlated to the internal pressure.

From the above it is clear that the thermal effects on an indirect pressure measurement by means of strain gauges will not cancel each other out in a bridge circuit of multiple strain gauges. However, with the active correction as described above, a measurement using only a single strain gauge is accurate enough.

In a further particularly advantageous embodiment, the combination of the at least one strain gauge and the read-out electronics forms a Wheatstone bridge circuit for measuring the electrical resistance change of the at least one strain gauge. Due to regulatory constraints as to the maximum allowable deformation of pressurized vessels, when the pressure inside a vessel is to be measured indirectly via the strain of the vessel, the to-be-measured resistance change of the strain gauge is inherently small. A Wheatstone bridge configuration is advantageous for measuring such small resistance changes, and because the thermal effects on the read-out electronics are dealt with in the active correction detailed above, the use of a Wheatstone bridge is possible without introducing a further error into the finally obtained resistance change value.

The measurement signal may be increased by using two strain gauges and two fixed resistors in a Wheatstone bridge circuit where the strain gauges are opposing resistors, so that their resistance changes are added in the measurement signal (to anyone skilled in the art known as the diagonal half bridge configuration).

The invention also provides a device for measuring the strain of an object. The device comprises at least one strain gauge that is attachable directly or indirectly to the object whose strain is to be measured. The device comprises a first temperature sensor configured to measure the temperature of the at least one strain gauge. The device further comprises read-out electronics configured to measure the change of electrical resistance of the at least one strain gauge. This read-out electronics comprise at least one fixed resistor whose value is relied upon when obtaining the change of the electrical resistance of the strain gauge as a result of the measurement.

The read-out electronics is configured such that the temperature of the at least one fixed resistor is known and/or obtainable by measurement. The device further comprises an evaluation unit that is configured to correct the measured change of electrical resistance, and/or a strain of the object determined from this change of resistance, for contributions that arise from the temperature of the strain gauge and from the temperature of the fixed resistor. This correction is based on the temperature of the strain gauge, the temperature of the fixed resistor, and pre-stored calibration data. As detailed above in the discussion of the method, the calibration data may come from any suitable source.

In a particularly advantageous embodiment, the at least one fixed resistor is disposed close to the strain gauge, so as to have a temperature similar to that of the strain gauge. In this manner, the temperature of the strain gauge and the temperature of the fixed resistor may be determined using one single measurement. If multiple fixed resistors are used, the temperatures of all fixed resistors need to be obtained somehow. As explained before, for example, the temperature of one resistor may be measured, and the temperatures of other resistors may be derived from this measurement.

Alternatively, the device may comprise a housing that accommodates at least the at least one fixed resistor of the read-out electronics. The device further comprises a second temperature sensor that is configured to measure a temperature inside the housing, and/or a cooling element or a heating element that is configured to maintain a known fixed temperature inside the housing, such that the temperature of the at least one fixed resistor (31) can be inferred.

As detailed above, if the temperature of the strain gauge and the temperature of the fixed resistor are known, an active correction of the measured change of electrical resistance may be performed in the evaluation unit.

To reduce the final measurement error further, the housing may accommodate the complete read-out electronics. While the fixed resistor is the element in the read-out electronics that may have the largest temperature-dependent effect on the measurement result, other components in the read-out electronics may have non-negligible effects as well.

In a further particularly advantageous embodiment, the combination of the at least one strain gauge and the read-out electronics forms a Wheatstone bridge circuit for measuring the change of electrical resistance of the at least one strain gauge. The Wheatstone bridge circuit comprises a voltage source, at least four resistors, and a voltmeter. The voltage measured by the voltmeter is then the primary measurement signal from which the change of electrical resistance of the at least one strain gauge may be derived.

In a further particularly advantageous embodiment, the device comprises a first strain gauge and a second strain gauge attachable to the object whose strain is to be measured. The first strain gauge is connected between the first terminal of the voltage source and the first terminal of the voltmeter. The second strain gauge is connected between the second terminal of the voltmeter and the second terminal of the voltage source. In this manner, the two strain gauges form opposing resistors in the Wheatstone bridge, so that their contributions are added. Thus, the measurement signal may be doubled.

In a further particularly advantageous embodiment, the evaluation unit is further configured to determine, from the measured strain of a vessel that serves as the object, in combination with the geometry of the vessel and material properties of the vessel, a pressure inside the vessel. In this manner, the pressure may be measured non-invasively.

In a further particularly advantageous embodiment, the device further comprises a clamp to which the at least one strain gauge is attached, and at least one fixing member for securing the clamp to the object whose strain is to be measured. In this manner, it is particularly easy to retro-fit the device to an existing object. In particular for applications in the field, i.e. in a process plant, it is much easier and more reliable for a user to rigidly attach a clamp to an object (e.g., by tightening the fixing member) than it is to directly attach the strain gauge with adhesives.

The invention also provides a method for obtaining calibration data for use in the course of the method described above, and/or in the evaluation unit of the device described above.

In the course of this method, the change of resistance of the at least one strain gauge is measured, and/or the strain of the object is measured, in a first measurement as a function of a varying temperature of the object whose strain is to be measured. At the same time, the temperature of the fixed resistor is kept constant. In this manner, a first calibration curve for the contribution of the strain gauge is obtained.

Alternatively, an approximation of this first calibration curve may be calculated based at least in part on data (polynomial temperature dependence of the signal) provided by the strain gauge supplier.

The change of resistance of the at least one strain gauge is also measured, and/or the strain of the object is also determined, in a second measurement as a function of a varying temperature of the fixed resistor. At the same time, the temperature of the object whose strain is to be measured is kept constant. In this manner, a second calibration curve for the contribution of the fixed resistor, and/or of the read-out electronics, is obtained.

In this manner, during the subsequent use of the method and/or the device, it may be determined, for each pair of a temperature of the strain gauge and a temperature of the fixed resistor, by which amount the measured change of resistance, and/or the determined strain, needs to be corrected in order to remove thermal effects. For example, this correction may be performed using linear superposition of a first contribution of thermal effects from the strain gauge and a second contribution of thermal effects from the fixed resistor. That is, both corrections may be applied independently of one another.

In the embodiment where the device comprises a clamp to which the at least one strain gauge is attached, the method preferably further comprises subtracting, from the measured change of resistance, and/or from the determined strain, a contribution caused by a thermal expansion difference between the object and the clamp. There is then a free choice of materials for the clamp, without a need to somehow match the thermal expansion coefficient of the clamp to that of the object whose strain is to be measured.

Figure 3:
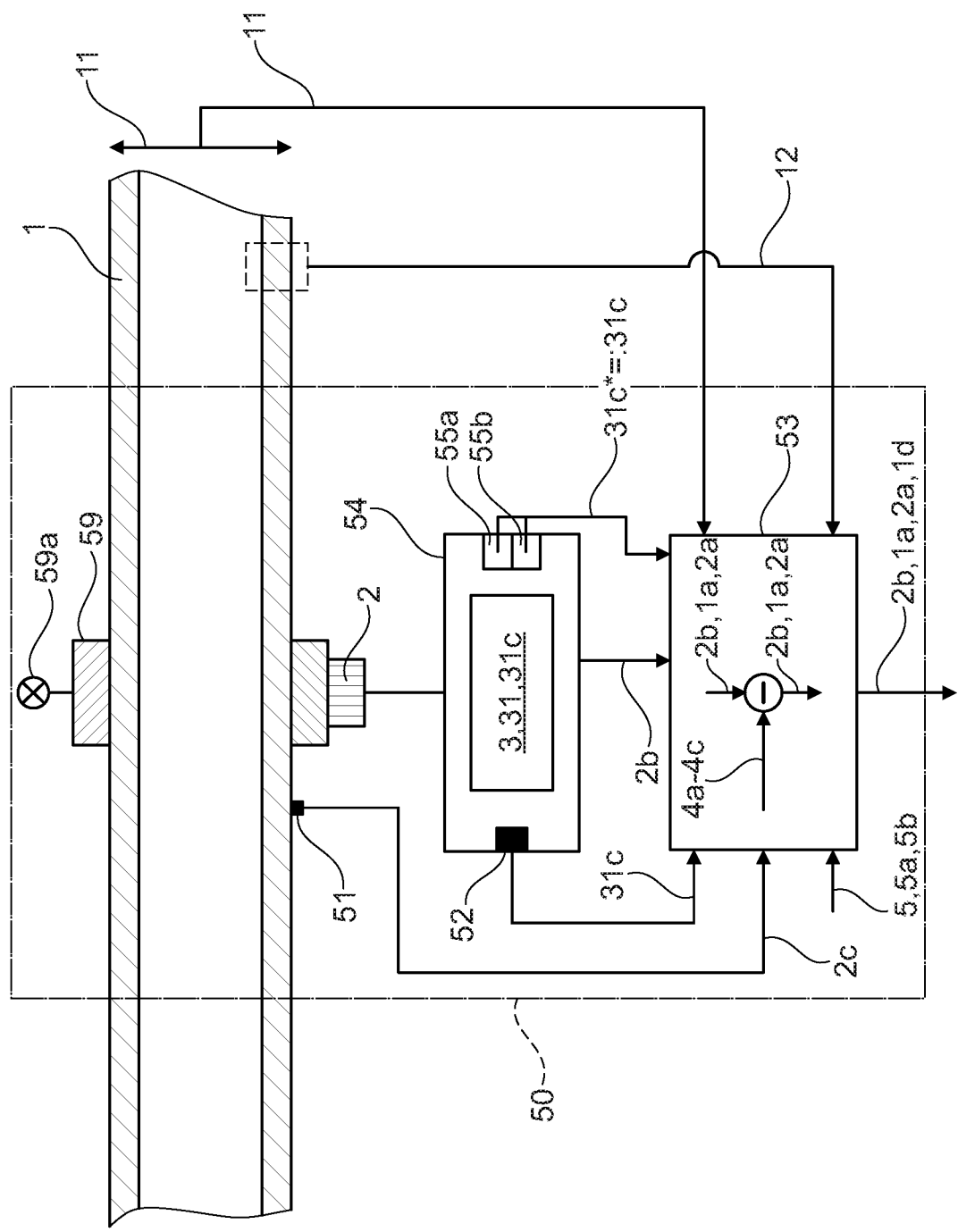
FIG. 3: Exemplary embodiment of device 50.

FIG. 1 is a flow chart of an exemplary embodiment of the method 100 for measuring the strain 1a of an object 1 that is illustrated in more detail in FIG. 3 together with at least one strain gauge 2. In step 110, the electrical resistance change 2b of the at least one strain gauge 2 is measured using read-out electronics 3 with at least one fixed resistor 31. The electrical resistance change 2b may be used to compute the strain 2a of the strain gauge 2, and/or the strain 1a of the object 1.

In step 120, the temperature 2c of the strain gauge 2 is measured using a first temperature sensor 51. In step 130, the temperature 31c of the fixed resistor 31 is measured using a second temperature sensor 52. Alternatively or in combination, in step 140, the temperature 31c of the fixed resistor 31 is maintained at a known fixed value $31c^*$ by means of a cooling element $55a$ and/or a heating element $55b$.

In step 150, the measured electrical resistance change $2b$, and/or the strain $2a$ of the strain gauge 2, and/or the strain $1a$ of the object 1, is corrected for a first contribution $4a$ that arises from the temperature $2c$ of the strain gauge, as well as for a second contribution $4b$ that arises from the temperature $31c$ of the fixed resistor 31. The correction is based on the temperature $2c$ of the strain gauge 2, the temperature $31c$ of the fixed resistor 31, and pre-stored calibration data 5, $5a$, $5b$.

In optional step 160, the strain $1a$ of the object 1, and/or the strain $2a$ of the strain gauge 2, is converted into the pressure $1d$ inside a vessel that serves as the object 1. This computation is further based on the geometry 11 and the material properties 12 of the vessel.

Figure 2:
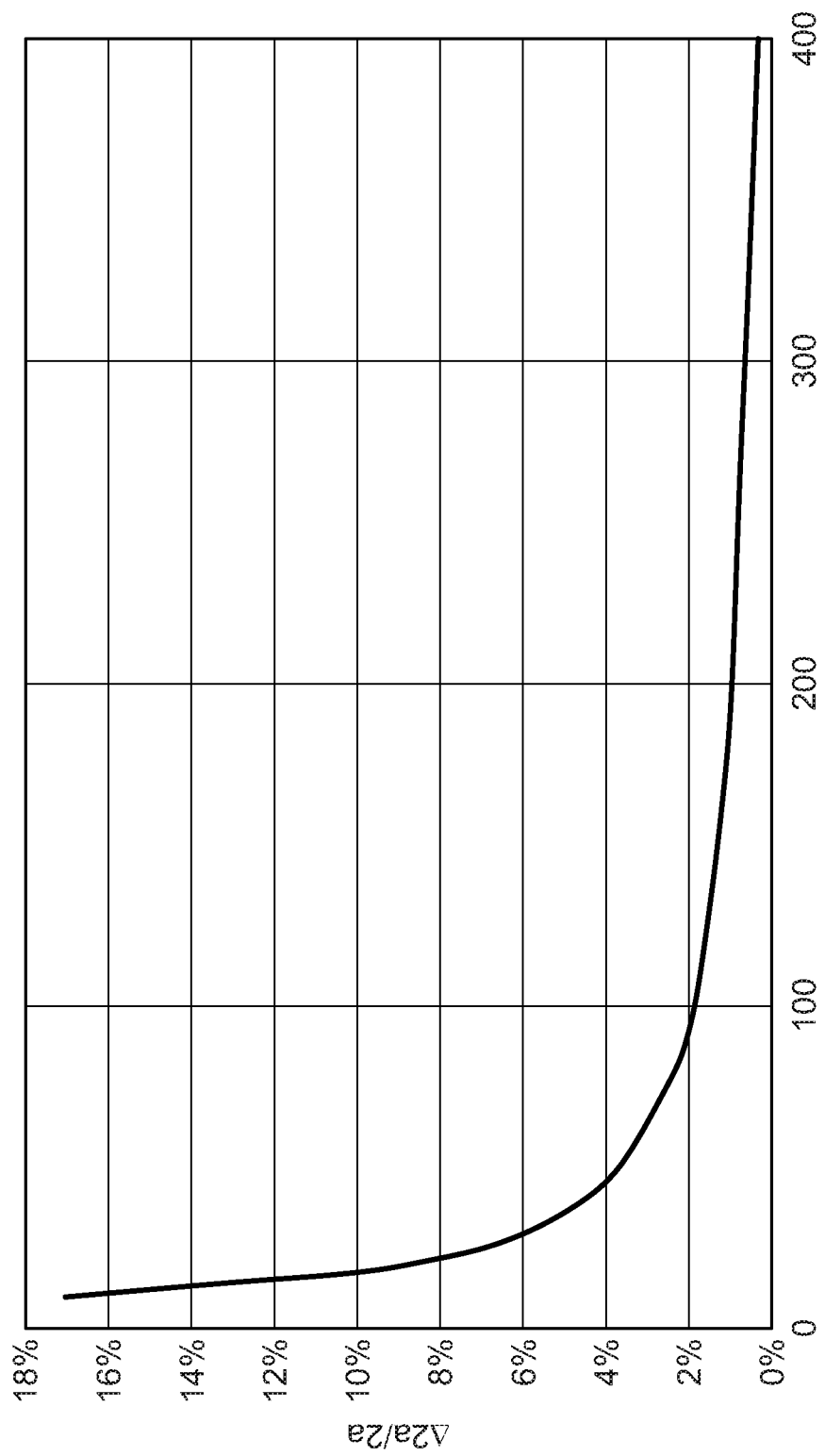
FIG. 2: Motivation of method 100 especially for smaller pipe diameters d.

FIG. 2 illustrates the reason why the correction illustrated in FIG. 1 is particularly advantageous for pipes with small diameters that serve as objects 1. For such objects 1, conventional full Wheatstone bridge circuits are not suited to compensate thermal expansion effects, so that the correction illustrated in FIG. 1 is required. The plot shows the relative error $\Delta 2a/2a$ of the strain $2a$ of the strain gauge $2a$ for different diameters d of pipes that serve as objects 1. Below a diameter d of about 100 mm, the relative error of the measured strain $\Delta 2a/2a$ rapidly increases. The main source for this error is the dependence of the measured strain $2a$ on the curvature radius with which the strain gauge 2 is attached to the pipe that serves as object 1.

FIG. 3 is a schematic illustration of an exemplary device 50 for measuring the strain of a pipe that serves as object 1. This illustration is not drawn to scale.

The device 50 comprises a clamp 59 that is attachable to the pipe that serves as object 1 by fixing means $59a$. In the example shown in FIG. 3, the fixing means are releasable (i.e., the clamp 59 may be non-destructively detached again from the pipe that serves as object 1), but this is not required. Actually, the concept of the invention remains valid in full when the strain gauge is attached directly to the pipe.

The strain gauge 2 is fixed to the clamp 59. A first temperature sensor 51 is attached to the object 1 close to the strain gauge 2 to measure the temperature $2c$ of the strain gauge 2. The first temperature sensor 51 may alternatively be attached to the clamp 59.

The electrical resistance change $2b$ of the strain gauge 2 is measured using read-out electronics 3 that are disposed inside a housing 54. The read-out electronics 3 comprise at least one fixed resistor 31, and the resistance value of this fixed resistor 31 is impacted by its temperature $31c$. Therefore, this temperature $31c$ may be measured with a second temperature sensor 52, and/or it may be actively set to a known value $31c^*$ by means of a cooling element $55a$ and/or a heating element $55b$.

The evaluation unit 53 gets the measured resistance change $2b$ of the strain gauge 2 as input and uses this to compute the strain $2a$ of the strain gauge 2, the strain $1a$ of the pipe that serves as object 1, and finally the pressure $1d$ within the pipe. Specifically, the geometry 11 and the material properties 12 of the pipe are used to compute the pressure $1d$ within the pipe that serves as object 1 from the strain $1a$ of the pipe.

To improve the accuracy of the measurement result, the electrical resistance change $2b$, the strain $2a$ of the strain gauge 2, and/or the strain $1a$ of the pipe that serves as object 1, is corrected for various temperature-dependent contributions. The first contribution $4a$ represents the temperature dependence of the electrical resistance change $2b$ of the strain gauge 2. To assess this contribution $4a$, the temperature $2c$ of the strain gauge 2 is used in conjunction with calibration data 5, $5a$. The second contribution $4b$ represents the temperature dependence of the resistance of the fixed resistor 31. To assess this contribution $4b$, the temperature $31c$ of the fixed resistor 31 is used in conjunction with calibration data 5, $5b$. If the thermal expansion coefficient of the clamp 59 does not match that of the pipe, then this introduces another temperature-dependent contribution $4c$. This contribution $4c$ can be assessed using the already known temperature $2c$ of the strain gauge in conjunction with the thermal expansion difference between the clamp 59 and the pipe that serves as object 1.

Figure 4:
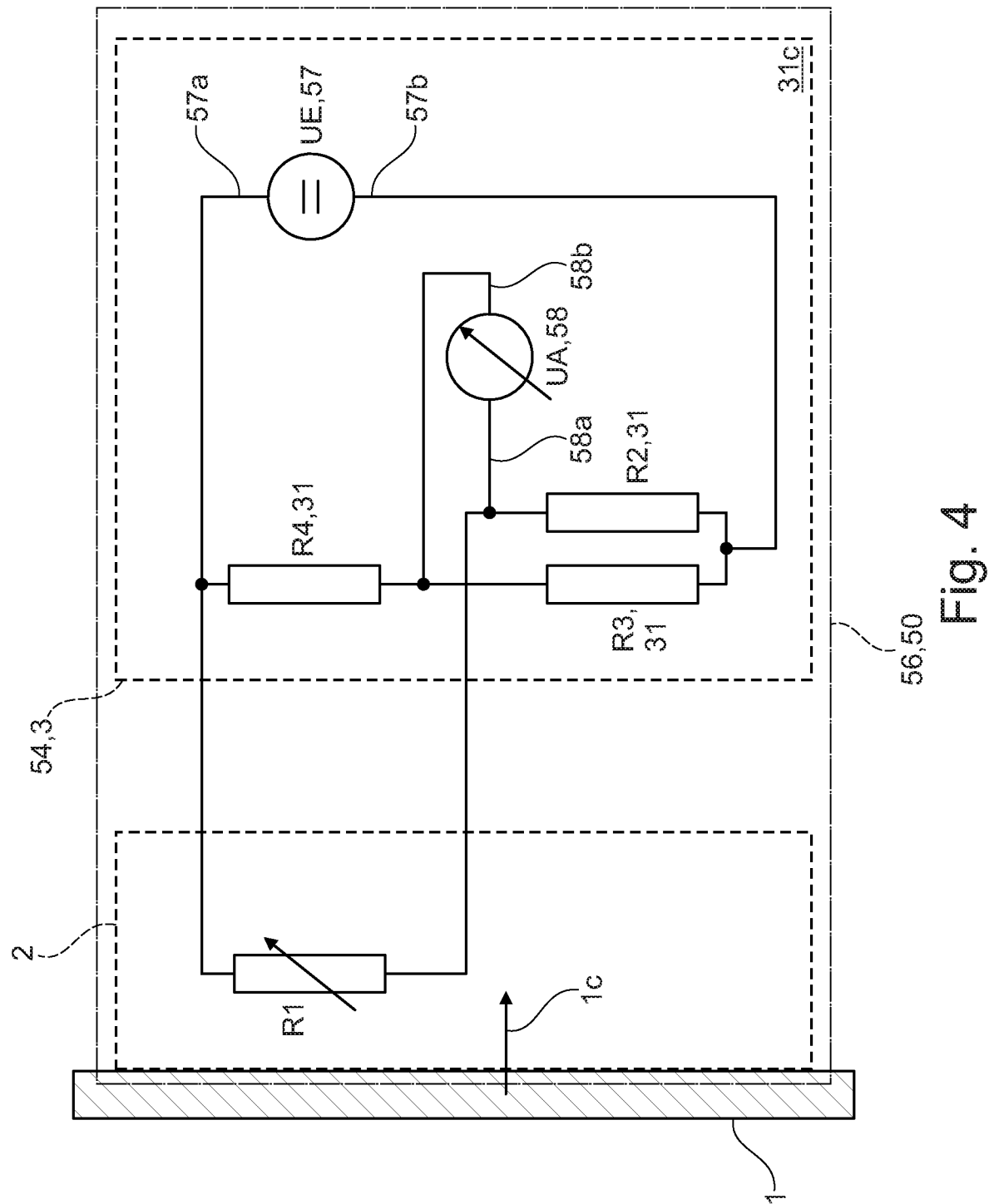
FIG. 4: Further embodiment of device 50 with one strain gauge 2.

FIG. 4 shows in more detail how the measurement may be performed inside device 50. The device 50 comprises a Wheatstone bridge circuit 56 with a voltage source 57 and a voltmeter 58. The voltage source 57 has a first terminal $57a$ and a second terminal $57b$, and it produces a voltage UE between these terminals $57a$ and $57b$. The voltmeter 58 has a first terminal $58a$ and a second terminal $58b$. It measures the voltage UA between these terminals $58a$ and $58b$.

The translation of the voltage UE from the voltage source 57 into the voltage UA measured by voltmeter 58 is dependent on the values of the four resistors R1-R4 of the Wheatstone bridge circuit 56. In the example shown in FIG. 4, the strain gauge 2 serves as the first resistor R1 with a variable resistance that has an unwanted dependence on the temperature $1c$ of the object 1 that is coupled into the adjacent strain gauge 2. The resistance values of the fixed resistors 31, R2-R4 depend on the temperature $31c$ within the housing 54 of the read-out electronics 3. If both temperature dependencies are corrected, then the strain $2a$ of the strain gauge 2, the strain $1a$ of the pipe calculated therefrom, and the finally obtained pressure $1d$ within the pipe that serves as object 1 will be much more accurate.

Figure 5:
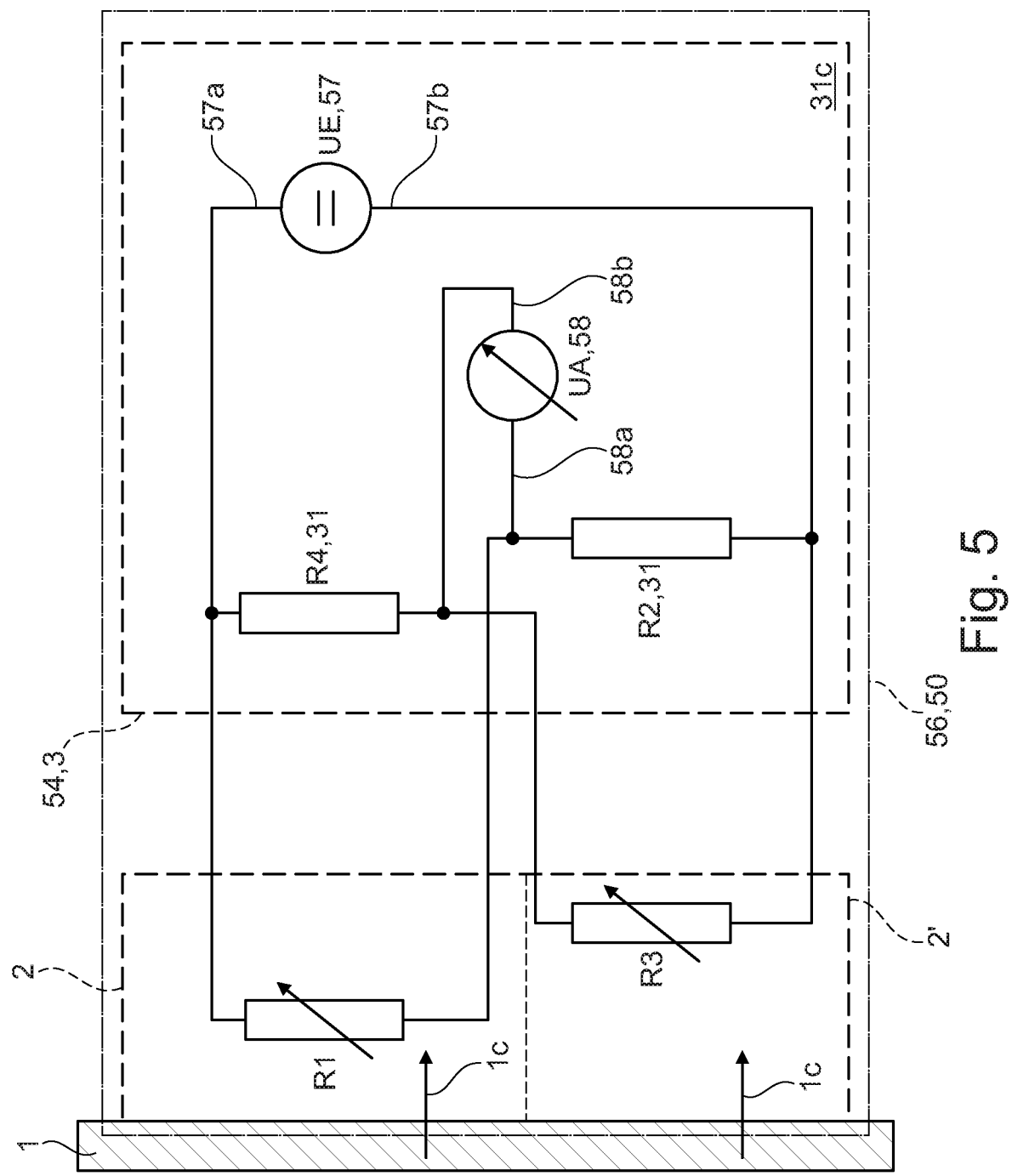
FIG. 5: Further embodiment of device 50 with two strain gauges 2, 2'.

The measurement signal is further improved by the further embodiment shown in FIG. 5. Compared with FIG. 4, the main difference is that there are two strain gauges 2 and 2' now. Again, the first strain gauge 2 serves as the first resistor R1, and it is connected between the first terminal $57a$ of the voltage source 57 and the first terminal $58a$ of the voltmeter 58. But the third resistor R3 is now variable as well. The second strain gauge 2' serves as this third resistor R3, and it is connected between the second terminal $58b$ of the voltmeter and the second terminal $57b$ of the voltage source. Both strain gauges 2 and 2' are exposed to about the same temperature $1c$ of the pipe. The second strain gauge 2' may measure a strain $1a'$ that is different from the strain $1a$ measured by the first strain gauge 2.

The components of the Wheatstone bridge circuit 56 may also be distributed among the housing 54 and the part applied to the pipe in a different manner. For example, all resistors R1-R4 may be applied to the pipe, so that they are all exposed to the temperature $1c$ of the pipe that serves as object 1.

Figure 6:
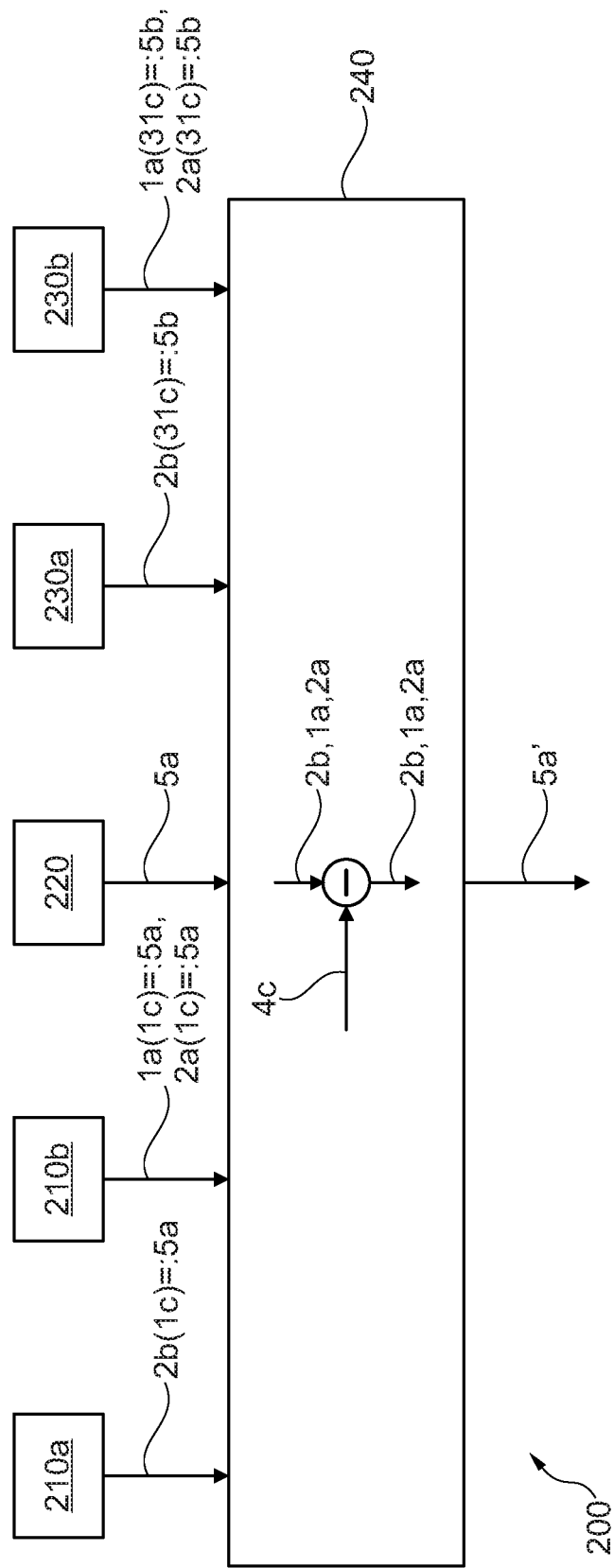
FIG. 6: Exemplary embodiment of method 200.

FIG. 6 shows an exemplary embodiment of the method 200 for obtaining calibration data 5 for use in the method 100, and/or in the device 50, as described above.

In step $210a$, the resistance change $2b$ of the at least one strain gauge 2 is measured as a function of a varying temperature $1c$ of the object 1 whose strain $1a$ is to be measured. Alternatively, or in combination, in step $210b$, the strain $2a$ of the strain gauge 2, and/or the strain $1a$ of the object 1, may be measured as a function of the temperature $1c$, based on the resistance change $2b$. During the measurements $210a$, $210b$, the temperature $31c$ of the at least one fixed resistor 31 in the read-out electronics 3 is kept constant. The measurement results for the resistance change 2b of the strain gauge 2, the strain 2a of the strain gauge 2, and/or the strain 1a of the pipe, are then only dependent on the temperature 1c of the pipe as the sole variable. This is the first calibration curve 5a.

An approximation of this first calibration curve 5a may also be calculated in step 220 based on data (polynomial temperature dependence of the signal) provided by the strain gauge supplier.

In step 230a, the resistance change 2b of the at least one strain gauge 2 is measured as a function of the varying temperature 31c of the fixed resistor 31. Alternatively, or in combination, in step 230b, the strain 2a of the strain gauge 2, and/or the strain 1a of the pipe, may be measured as a function of the temperature 31c, based on the resistance change 2b. During the measurements 230a, 230b, the temperature 1c of the pipe is kept constant. The measurement results for the resistance change 2b of the strain gauge 2, the strain 2a of the strain gauge 2, and/or the strain 1a of the pipe, are then only dependent on the temperature 31c of the fixed resistor 31. This is the second calibration curve 5b.

If a clamp 59 is used to attach the strain gauge 2 to the pipe that serves as object 1, then the contribution 4c of a mismatch between the thermal expansion coefficients of the clamp 59 and of the pipe that serves as object 1 may be corrected for in step 240, yielding refined calibration curve 5a'.

Figure 7A:
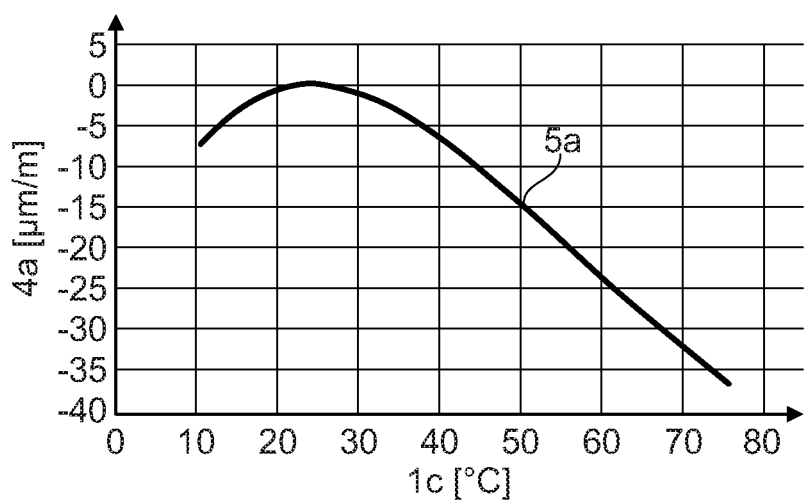
FIGS. 7a-7c: Exemplary results from applying methods 100, 200.

FIG. 7a shows an exemplary first calibration curve 5a. This first calibration curve 5a represents the contribution 4a of the temperature dependence of the strain gauge 2 to the measured strain 2a, in the same unit μm/m as this strain 2a.

Figure 7B:
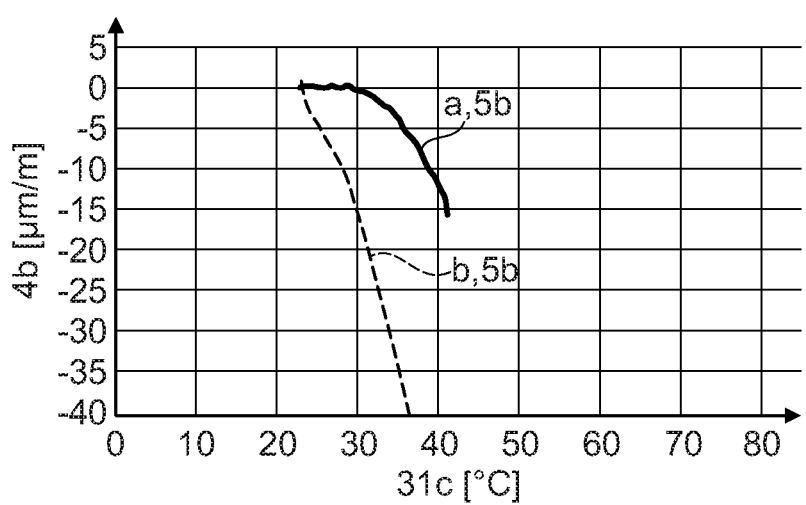

FIG. 7b shows two exemplary second calibration curves 5b. Curve a,5b represents the contribution 4b of the temperature dependence of a first read-out electronics 3 to the measured strain 2a, in the same unit μm/m as this strain 2a. Curve b,5b represents the contribution 4b of the temperature dependence of a second read-out electronics 3 to the measured strain 2a.

To put the contributions 4a and 4b into a numerical perspective, in an exemplary application where a pipe with 100 mm inner diameter and a wall thickness of 12 mm guides liquid media at pressures of up to 350 bar, 1 bar of pressure 1d in the pipe that serves as object 1 corresponds to about 1 μm/m of strain 2a. This means that the when the temperature changes, the accuracy of the measurement decays rapidly. For example, an increase from 22° C. (room temperature) to 40° C. may cause an error of about 6 bar due to contribution 4a, plus an error of about 15 bar due to contribution 4b if the better electronics is used (curve a in FIG. 7b). This error is substantial and may preclude the measurement results from being used directly in process control.

Figure 7C:
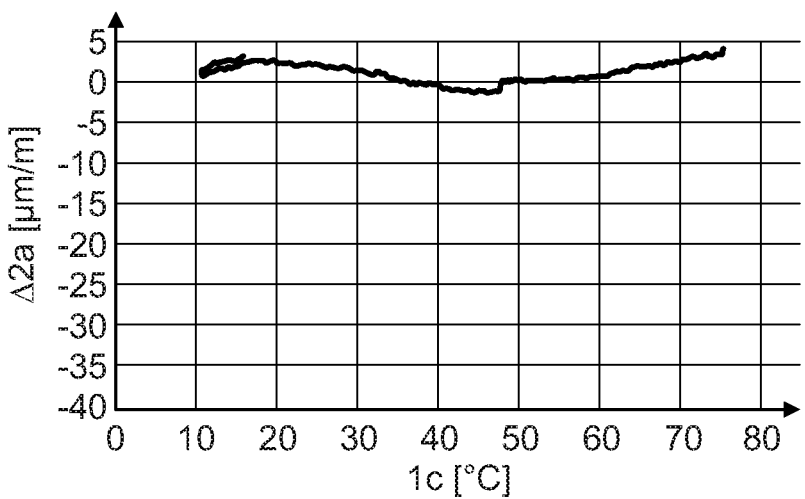

FIG. 7c shows the improvement achieved by correcting for both contributions 4a and 4b. In the entire range of the temperature 1c of the pipe, the maximum error 42a of the strain is about 5 μm/m, which corresponds to an error in the pressure 1d of about 5 bar. For many purposes, this is sufficiently accurate, so that the addition of invasive pressure measurement ports to the pipe may be saved.

The contribution 4b from the temperature dependence of the read-out electronics 3 may be further reduced by thermally uncoupling the read-out electronics 3 from the pipe whose temperature 1c may vary as a function of the time. For example, the distance between the read-out electronics 3 and the pipe may be increased, a thermal insulation may be installed between the read-out electronics 3 and the pipe, and/or the housing 54 may be equipped with a high thermal capacity buffer.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1 object whose strain 1a is to be measured
1a, 1a' strains measured on object 1
1c temperature of object 1
1d pressure in pipe that serves as object 1
11 geometry of pipe that serves as object 1
12 material properties of pipe that serves as object 1
2, 2' strain gauges
2a strain of strain gauge 2
Δ2a error of strain 2a
2b electrical resistance change of strain gauge 2
2c temperature of strain gauge 2
3 read-out electronics
31 fixed resistor in read-out electronics 3
31c temperature of fixed resistor 31
31c* known fixed value at which temperature 31c is maintained
4a contribution of strain gauge 2 to error in strain 2a
4b contribution of fixed resistor 31 to error in strain 2a
4c contribution of clamp 59 thermal expansion to error in strain 2a
5 calibration data
5a calibration curve for contribution 4a of strain gauge 2
5a' refined version of calibration curve 5a, corrected for contribution 4c
5b calibration curve for contribution 4b of fixed resistor 31
50 device for measuring strain 1a of object 1
51 first temperature sensor for temperature 2c
52 second temperature sensor for temperature 31c
53 evaluation unit of device 50
54 housing for read-out electronics 3
55a cooling element 55b heating element
56 Wheatstone bridge circuit
57 voltage source in bridge circuit 56
57a-b terminals of voltage source 57
58 voltmeter in bridge circuit 56
58a-b terminals of voltmeter 58
59 clamp
59a fixing means for clamp 59
100 method for measuring strain 1a of object 1
110 measuring resistance change 2b of strain gauge 2
120 measuring temperature 2c of strain gauge 2
130 measuring temperature 31c of resistor 31
140 fixing temperature 31c of resistor 31 to value 31c*
150 correcting for temperature-dependent contributions 4a, 4b
160 determining pressure 1d inside pipe
200 method for obtaining calibration data 5
210a measuring variable resistance change 2b(1c) of strain gauge 2
210b determining variable strain 1a(1c) of object 1, 2a(1c) of strain gauge 2
220 calculating approximation of first calibration curve 5a
230a measuring variable resistance change 2b(31c) of strain gauge 2
230b measuring variable strain 1a(31c) of object 1, 2a(1c) of strain gauge 2
240 subtracting thermal expansion contribution 4c
a,5b, b,5b curves
d pipe diameter
R1-R4 resistors
UE voltage of voltage source 57
UA voltage measured by voltmeter 58

What is claimed is:

1. A device for measuring a strain of an object independently of temperature variations, comprising:
at least one strain gauge that is attachable directly or indirectly to the object whose strain is to be measured;
a first temperature sensor configured to measure a temperature of the at least one strain gauge;
read-out electronics configured to measure a change of electrical resistance of the at least one strain gauge as a measured electrical resistance change, the read-out electronics comprising at least one fixed resistor whose value is relied upon when obtaining a value of the change of electrical resistance of the strain gauge as a result of the measurement, the read-out electronics being configured such that a temperature of the at least one fixed resistor is known and/or obtainable by measurement; and
an evaluation unit configured to: correct the measured electrical resistance change, and/or a strain of the strain gauge and/or the strain of the object determined from the resistance change, for contributions that arise from the temperature of the at least one strain gauge and from the temperature of the at least one fixed resistor, based on the temperature of the strain gauge, the temperature of the at least one fixed resistor, and pre-stored calibration data.

2. The device of claim 1, wherein the at least one fixed resistor is disposed close to the strain gauge, so as to have a temperature similar to that of the strain gauge.

3. The device of claim 1, further comprising:
a housing that accommodates at least the at least one fixed resistor of the read-out electronics; and
a second temperature sensor that is configured to measure a temperature inside the housing such that the temperature of the at least one fixed resistor is inferrable;
and/or a cooling element or a heating element that is configured to maintain a known fixed temperature inside the housing.

4. The device of claim 3, wherein the housing accommodates the read-out electronics.

5. The device of claim 1, wherein a combination of the at least one strain gauge and the read-out electronics forms a Wheatstone bridge circuit configured to measure an electrical resistance change of the at least one strain gauge, and
wherein the Wheatstone bridge circuit comprises a voltage source, at least four resistors, and a voltmeter.

6. The device of claim 5, further comprising:
a first strain gauge; and
a second strain gauge attachable to the object whose strain is to be measured,
wherein the first strain gauge is connected between a first terminal of the voltage source and a first terminal of the voltmeter, and the second strain gauge is connected between a second terminal of the voltmeter and a second terminal of the voltage source.

7. The device of claim 1, wherein the object comprises a vessel, and
wherein the evaluation unit is configured to determine, from a measured strain of the vessel, a geometry of the vessel, material properties of the vessel, and a pressure inside the vessel.

8. The device of claim 1, further comprising:
a clamp to which the at least one strain gauge is attached; and
at least one fixing member configured to secure the clamp to the object whose strain is to be measured.

9. A method for measuring a strain of an object independently of temperature variations, comprising:
using at least one strain gauge that exhibits an electrical resistance change in response to a change in the strain, the strain gauge being mechanically coupled to the object;
measuring a change of electrical resistance of the at least one strain gauge using read-out electronics as a measured change of electrical resistance, the read-out electronics comprising at least one fixed resistor whose value is relied upon when obtaining a value of the change of electrical resistance of the strain gauge as a result of the measurement;
measuring a temperature of the strain gauge;
measuring a temperature of the at least one fixed resistor, and/or maintaining the temperature of the at least one fixed resistor at a known fixed value; and
correcting the measured change of electrical resistance, and/or a strain of the strain gauge and/or the strain of the object determined from the measured electrical resistance change, for contributions that arise from the temperature of the strain gauge and from the temperature of the at least one fixed resistor, based on the temperature of the strain gauge, the temperature of the at least one fixed resistor, and pre-stored calibration data.

10. The method of claim 9, wherein the object comprises a pressurizable vessel, and
wherein the method further comprises: determining, from the measured strain, a geometry of the vessel, material properties of the vessel, and a pressure inside the vessel.

11. The method of claim 9, wherein a combination of the at least one strain gauge and the read-out electronics forms a Wheatstone bridge circuit configured to measure the change of electrical resistance of the at least one strain gauge.

12. A method for obtaining calibration data for use in the method of claim 9, comprising:
measuring the resistance change of the at least one strain gauge, and/or determining the strain of the object, as a function of a varying temperature of the object whose strain is to be measured, while keeping the temperature of the at least one fixed resistor constant, so as to obtain a first calibration curve, or
calculating an approximation of the first calibration curve based at least in part on data on a temperature dependence of a signal provided by a supplier of the strain gauge; and
measuring the resistance change of the at least one strain gauge, and/or determining the strain of the object, as a function of a varying temperature of the at least one fixed resistor, while keeping the temperature of the object whose strain is to be measured constant, so as to obtain a second calibration curve.

13. The method of claim 12, wherein the device comprises a device for measuring a strain of an object independently of temperature variations, comprising:
at least one strain gauge that is attachable directly or indirectly to the object whose strain is to be measured;
a first temperature sensor configured to measure a temperature of the at least one strain gauge;
read-out electronics configured to measure a change of electrical resistance of the at least one strain gauge as a measured electrical resistance change, the read-out electronics comprising at least one fixed resistor whose value is relied upon when obtaining a value of the change of electrical resistance of the strain gauge as a result of the measurement, the read-out electronics being configured such that a temperature of the at least one fixed resistor is known and/or obtainable by measurement; and
an evaluation unit configured to: correct the measured electrical resistance change, and/or a strain of the strain gauge and/or the strain of the object determined from the resistance change, for contributions that arise from the temperature of the at least one strain gauge and from the temperature of the at least one fixed resistor, based on the temperature of the strain gauge, the temperature of the at least one fixed resistor, and pre-stored calibration data;
a housing that accommodates at least the at least one fixed resistor of the read-out electronics; and
a second temperature sensor that is configured to measure a temperature inside the housing such that the temperature of the at least one fixed resistor is inferrable;
and/or a cooling element or a heating element that is configured to maintain a known fixed temperature inside the housing,
wherein the method further comprises: subtracting, from the measured resistance change, and/or from the determined strain, a contribution caused by a thermal expansion difference between the object and the clamp.

14. A method for obtaining calibration data for use in the evaluation unit of the device of claim 1, comprising:
measuring the resistance change of the at least one strain gauge, and/or determining the strain of the object, as a function of a varying temperature of the object whose strain is to be measured, while keeping the temperature of the at least one fixed resistor constant, so as to obtain a first calibration curve, or
calculating an approximation of the first calibration curve based at least in part on data on a temperature dependence of a signal provided by the supplier of the strain gauge; and
measuring the resistance change of the at least one strain gauge, and/or determining the strain of the object, as a function of a varying temperature of the fixed resistor, while keeping the temperature of the object whose strain is to be measured constant, so as to obtain a second calibration curve.

15. The method of claim 14, wherein the device comprises a device for measuring a strain of an object independently of temperature variations, comprising:
at least one strain gauge that is attachable directly or indirectly to the object whose strain is to be measured;
a first temperature sensor configured to measure a temperature of the at least one strain gauge;
read-out electronics configured to measure a change of electrical resistance of the at least one strain gauge as a measured electrical resistance change, the read-out electronics comprising at least one fixed resistor whose value is relied upon when obtaining a value of the change of electrical resistance of the strain gauge as a result of the measurement, the read-out electronics being configured such that a temperature of the at least one fixed resistor is known and/or obtainable by measurement; and
an evaluation unit configured to: correct the measured electrical resistance change, and/or a strain of the strain gauge and/or the strain of the object determined from the resistance change, for contributions that arise from the temperature of the at least one strain gauge and from the temperature of the at least one fixed resistor, based on the temperature of the strain gauge, the temperature of the at least one fixed resistor, and pre-stored calibration data;
a housing that accommodates at least the at least one fixed resistor of the read-out electronics; and
a second temperature sensor that is configured to measure a temperature inside the housing such that the temperature of the at least one fixed resistor is inferrable;
and/or a cooling element or a heating element that is configured to maintain a known fixed temperature inside the housing, and
wherein the method further comprises: subtracting, from the measured resistance change, and/or from the determined strain, a contribution caused by a thermal expansion difference between the object and the clamp.

\* \* \* \* \*